(12) United States Patent
Nakaso et al.

(10) Patent No.: US 10,882,409 B2
(45) Date of Patent: Jan. 5, 2021

(54) ONBOARD CHARGING SYSTEM INCLUDING A HEAT EXCHANGER

(71) Applicant: SUBARU CORPORATION, Tokyo (JP)

(72) Inventors: Yoshiaki Nakaso, Tokyo (JP); Akifumi Sugaya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 16/160,866

(22) Filed: Oct. 15, 2018

(65) Prior Publication Data

US 2019/0168593 A1 Jun. 6, 2019

(30) Foreign Application Priority Data

Dec. 1, 2017 (JP) ................................. 2017-231896

(51) Int. Cl.
*B60L 53/00* (2019.01)
*B60L 53/18* (2019.01)
(Continued)

(52) U.S. Cl.
CPC ................ *B60L 53/18* (2019.02); *B60K 1/04* (2013.01); *B60L 1/003* (2013.01); *B60L 1/02* (2013.01);
(Continued)

(58) Field of Classification Search
CPC .. B60L 58/26; B60L 58/24; B60L 1/02; B60L 1/003; B60L 53/302; B60L 53/14;
(Continued)

(56) References Cited

U.S. PATENT DOCUMENTS

| 4,007,315 A | * | 2/1977 | Brinkmann | ......... | H01M 10/625 |
| | | | | | 429/62 |
| 5,670,860 A | | 9/1997 | Conrady et al. | | |

(Continued)

FOREIGN PATENT DOCUMENTS

| JP | H 09-129036 A | 5/1997 |
| JP | 2008-092624 A | 4/2008 |

(Continued)

OTHER PUBLICATIONS

Japanese Office Action, dated Oct. 29, 2019, in Japanese Application No. 2017-231896 and English Translation thereof.

*Primary Examiner* — Naum Levin
(74) *Attorney, Agent, or Firm* — McGinn I.P. Law Group, PLLC.

(57) ABSTRACT

An onboard charging system includes an onboard battery, a vehicle-side coupling unit, a heat exchanger, a controller, and a charger. The onboard battery that is configured to be mounted on a vehicle and used to drive the vehicle. The vehicle-side coupling unit that is configured to make a charging current path to an outside-vehicle power feeding apparatus by being coupled to an apparatus-side coupling unit of the outside-vehicle power feeding apparatus. The heat exchanger that is provided in the vehicle-side coupling unit and configured to perform heat exchange between the vehicle-side coupling unit and the apparatus-side coupling unit. The controller that is configured to perform ON/OFF control of a function of the heat exchange performed by the heat exchanger. The charger that is configured to charge the onboard battery by using the charging current path.

12 Claims, 8 Drawing Sheets

(51) Int. Cl.
*H01B 7/42* (2006.01)
*H02J 7/00* (2006.01)
*B60K 1/04* (2019.01)
*B60L 58/24* (2019.01)
*B60L 1/00* (2006.01)
*B60L 53/302* (2019.01)
*B60L 1/02* (2006.01)
*B60L 58/26* (2019.01)
*B60L 53/14* (2019.01)
*B60K 1/00* (2006.01)

(52) U.S. Cl.
CPC ............. *B60L 53/302* (2019.02); *B60L 58/24* (2019.02); *B60L 58/26* (2019.02); *H01B 7/423* (2013.01); *H02J 7/0042* (2013.01); *B60K 2001/003* (2013.01); *B60L 53/14* (2019.02); *B60L 2240/36* (2013.01); *Y02T 10/70* (2013.01); *Y02T 10/7072* (2013.01); *Y02T 90/12* (2013.01); *Y02T 90/14* (2013.01)

(58) Field of Classification Search
CPC ....... B60L 2240/36; B60L 53/18; B60K 1/04; B60K 2001/003; H02J 7/0042; H01B 7/423; Y02T 90/12; Y02T 90/14; Y02T 10/70; Y02T 10/7072
See application file for complete search history.

(56) References Cited

U.S. PATENT DOCUMENTS

| | | | | |
|---|---|---|---|---|
| 7,683,570 | B2 * | 3/2010 | Krauer | B60L 1/04 320/104 |
| 7,973,516 | B2 * | 7/2011 | Flack | H02G 11/02 320/137 |
| 8,037,954 | B2 * | 10/2011 | Taguchi | B60H 1/00257 180/65.1 |
| 8,098,044 | B2 * | 1/2012 | Taguchi | B60L 58/26 320/109 |
| 8,350,526 | B2 * | 1/2013 | Dyer | B60L 1/003 320/109 |
| 8,760,115 | B2 * | 6/2014 | Kinser | B60L 1/003 320/109 |
| 8,884,773 | B2 * | 11/2014 | Wiesemann | B60L 3/0069 340/635 |
| 9,287,646 | B2 * | 3/2016 | Mark | H01R 13/005 |
| 9,321,362 | B2 * | 4/2016 | Woo | B60L 11/1818 |
| 9,527,403 | B2 * | 12/2016 | Mardall | H01M 10/625 |
| 9,586,497 | B2 * | 3/2017 | Epstein | B60L 11/187 |
| 9,796,241 | B2 * | 10/2017 | Takeuchi | B60L 1/08 |
| 10,081,262 | B2 * | 9/2018 | Nagel | B60L 53/16 |
| 10,340,709 | B2 * | 7/2019 | Dyer | B60L 58/27 |
| 2009/0256523 | A1 | 10/2009 | Taguchi | |
| 2012/0202373 | A1 * | 8/2012 | Klinghult | H01R 13/6608 439/485 |
| 2015/0054460 | A1 * | 2/2015 | Epstein | B60L 11/187 320/109 |
| 2015/0217654 | A1 | 8/2015 | Woo et al. | |
| 2015/0306974 | A1 * | 10/2015 | Mardall | H01M 10/625 320/150 |
| 2016/0200206 | A1 | 7/2016 | Woo et al. | |
| 2017/0088005 | A1 * | 3/2017 | Christen | B60L 11/1874 |
| 2017/0297431 | A1 * | 10/2017 | Epstein | F01P 3/20 |
| 2018/0304757 | A1 * | 10/2018 | Vaughan | B60L 53/14 |
| 2019/0047429 | A1 * | 2/2019 | Torkelson | H01M 10/486 |

FOREIGN PATENT DOCUMENTS

| | | |
|---|---|---|
| JP | 2011-139572 A | 7/2011 |
| JP | 2013-235773 A | 11/2013 |
| JP | 2017-507640 A | 3/2017 |

* cited by examiner

ONBOARD CHARGING SYSTEM INCLUDING A HEAT EXCHANGER

CROSS-REFERENCE TO RELATED APPLICATIONS

The present application claims priority from Japanese Patent Application No. 2017-231896 filed on Dec. 1, 2017, the entire contents of which are hereby incorporated by reference.

BACKGROUND

1. Technical Field

An example of the present invention relates to an onboard charging system including a coupling unit that can be coupled to a power feeding apparatus outside a vehicle so as to charge a battery mounted on the vehicle. Specifically, an example of the present invention relates to a technical field concerning an onboard charging system that can adjust the temperature of a coupling unit on the side of a vehicle by exchanging heat with a coupling unit on the side of a power feeding apparatus outside the vehicle.

2. Related Art

Vehicles using onboard batteries (driving batteries) as power sources for driving the vehicles are becoming widespread, which are so-called electric automobiles and hybrid vehicles for instance. Increase in driving battery capacity for such vehicles is being promoted.

Japanese Unexamined Patent Application Publication No. H9-129036 discloses a configuration of a cooling system that cools a transmission cable in a vehicle-side portion as an instance of such techniques relating to charging of onboard batteries.

SUMMARY OF THE INVENTION

An onboard charging system according to an aspect of the present invention includes an onboard battery that is configured to be mounted on a vehicle and used to drive the vehicle, a vehicle-side coupling unit that is configured to make a charging current path to an outside-vehicle power feeding apparatus by being coupled to an apparatus-side coupling unit of the outside-vehicle power feeding apparatus, a heat exchanger that is provided in the vehicle-side coupling unit and configured to perform heat exchange between the vehicle-side coupling unit and the apparatus-side coupling unit, a controller that is configured to perform ON/OFF control of a function of the heat exchange performed by the heat exchanger, and a charger that is configured to charge the onboard battery by using the charging current path.

DETAILED DESCRIPTION

In the following, some preferred examples of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

It can be expected that facilities of power feeding apparatuses for charging from external power sources will be more widespread in the future so as to be ready for a larger number of electric automobiles. It can also be expected that, with increase in the capacity of a driving battery, output of external charging electric power will tend to be higher so as to shorten charging time. The higher output involves heat that a wire harness, a charging cable, and a charging inlet serving as a contact resistor generate.

To widen the diameter of a cable is conceivable so as to address such heat generation. However, a cable resistant to high output, such as output of 100 kW or so, is heavy and lacks flexibility while usability of a user who uses the power feeding apparatus is decreased. Increase in storage space is also caused.

Similarly on the vehicle side, to make the diameter of a cable in a vehicle too wide is not preferable because the increase in weight decreases power efficiency and an advantage that increase in the capacity of an onboard battery enables long-distance travel is lessened.

Considering such circumstances, it is desirable to offer a configuration for cooling each unit on the vehicle side and each unit on the power feeding apparatus side.

<1. Structure of Onboard Charging System>

An onboard charging system according to an example is described below.

Figure 1:
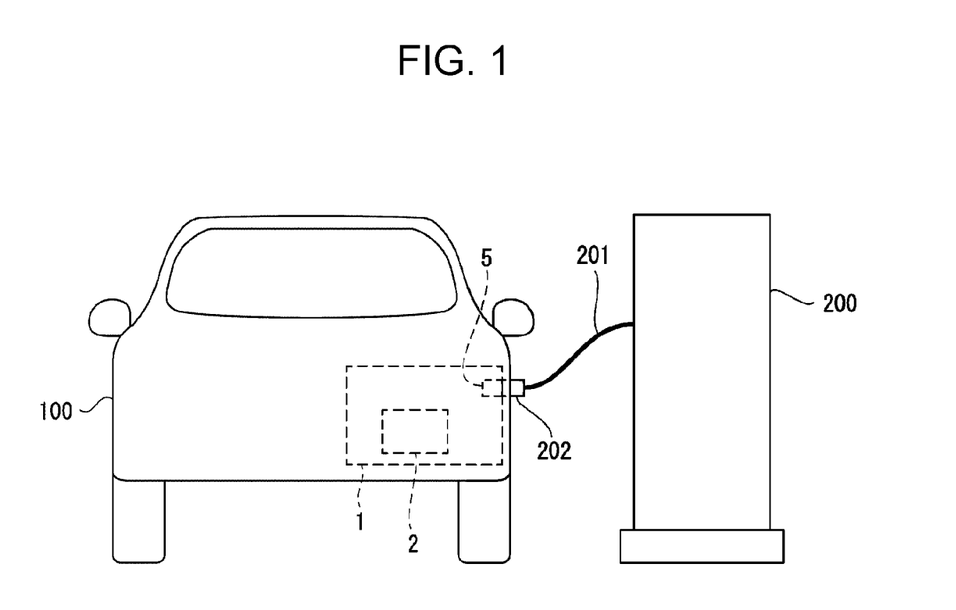
FIG. 1 is a schematic diagram illustrating a vehicle and an outside-vehicle power feeding apparatus according to an example of the present invention.

FIG. 1 schematically illustrates an onboard charging system 1 mounted on a vehicle 100 and an outside-vehicle power feeding apparatus 200 outside the vehicle 100. The vehicle 100 is a plug-in hybrid vehicle or an electric automobile for instance, and includes a high-capacity battery used for travel of the vehicle. In the present example, the onboard charging system 1 includes a high-capacity onboard battery 2.

The onboard charging system 1 can be charged by the outside-vehicle power feeding apparatus 200 by being electrically coupled to the outside-vehicle power feeding apparatus 200 through a coupling cable 201.

That is, as illustrated in FIG. 1, an apparatus-side coupling unit (a connector) 202 is provided at an end of the coupling cable 201 and the apparatus-side coupling unit 202 is attached to a vehicle-side coupling unit (an inlet) 5 provided in the vehicle 100. In this state, a charging current path for charging the onboard battery 2 from the outside-vehicle power feeding apparatus 200 is made and charging is performed.

Figure 2:
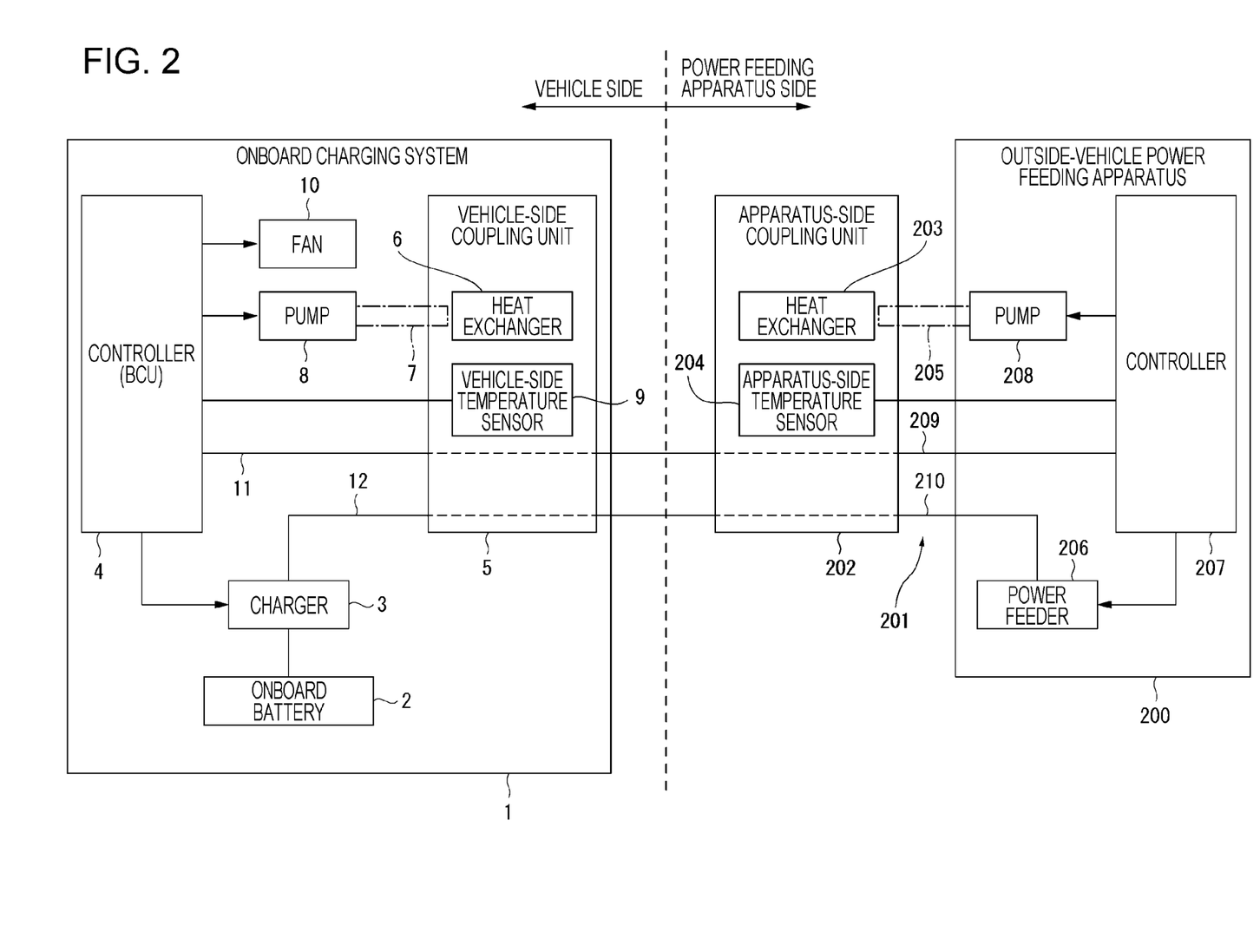
FIG. 2 is a block diagram illustrating an onboard charging system and the power feeding apparatus.

FIG. 2 is an instance of a block diagram illustrating the onboard charging system 1, the outside-vehicle power feeding apparatus 200 for supplying charging current to the onboard charging system 1, and the coupling cable 201 that couples the onboard charging system 1 and the outside-vehicle power feeding apparatus 200 together.

The onboard charging system 1 includes the onboard battery 2, a charger 3 for charging the onboard battery 2, a battery control unit (BCU) 4 with various functions for charging, and the vehicle-side coupling unit 5 to which the coupling cable 201 can be coupled.

The onboard battery 2 serves as a secondary battery group in a form called a battery module for instance, and includes a plurality of battery cells, which are coupled in series to one another. As each battery cell, for instance, a battery cell of a lithium ion battery, a nickel metal hydride battery, or the like can be employed.

The onboard battery 2 is used as a power supply of an unillustrated motor for travel, which is included in the vehicle 100.

Part of the plurality of battery cells may be coupled in parallel.

The charger 3 includes an AC/DC converter, which converts alternating current to direct current when alternating current is supplied from the outside-vehicle power feeding apparatus 200, an electromagnetic relay for electrically separating the onboard battery 2, a sensor for measuring a current value, and a sensor for measuring a temperature.

The BCU 4 includes, for instance, a microcomputer including a central processing unit (CPU) and read only memory (ROM) and controls the charger 3. The control performed on the charger 3 includes, for instance, ON/OFF control of charging operation for the onboard battery 2 and control of charging current by monitoring the state of the onboard battery 2. In one example, the BCU 4 may serve as a "the controller".

The vehicle-side coupling unit 5, which includes a lid, is provided on an outer surface of the vehicle 100 for instance. The vehicle-side coupling unit 5 establishes electrical coupling between the outside-vehicle power feeding apparatus 200 and the onboard charging system 1 by being coupled to the apparatus-side coupling unit 202, which is described below. The electrical coupling enables the onboard battery 2 to be charged using the outside-vehicle power feeding apparatus 200.

The onboard battery 2 needs longer charging time with increase in its capacity. Although use of large current is conceivable so as to solve this issue, heat generation brings another issue. Thus, a heat exchanger 6 is provided in the vehicle-side coupling unit 5 while the onboard charging system 1 has a circulation path 7 (indicated with a dot-and-dash line in FIG. 2) in which a coolant can circulate and includes a pump 8 for circulating the coolant. The heat exchanger 6 is in contact with the circulation path 7 and maintains the temperature of each unit in the vehicle-side coupling unit 5 at a suitable temperature by moving the heat generated in the vehicle-side coupling unit 5 to the coolant. The coolant may be, for instance, water or a mixture of water and ethylene glycol (antifreeze).

The BCU 4 performs ON/OFF control of the pump 8.

The vehicle-side coupling unit 5 includes, for instance, a vehicle-side temperature sensor 9 that can measure the temperature of the heat exchanger 6. The BCU 4 may control the pump 8 on the basis of temperature information acquired from the vehicle-side temperature sensor 9.

The onboard charging system 1 includes a fan 10. The BCU 4 controls the fan 10 on the basis of the temperature information acquired from the vehicle-side temperature sensor 9. When the fan 10 is driven, heat exchange is performed between the heat exchanger 6 of the vehicle-side coupling unit 5 and a heat exchanger 203 of the apparatus-side coupling unit 202, which is described below.

The fan 10 can change a rotation direction by controlling driving current and, according to the rotation direction, can move air in a direction from the heat exchanger 6 on the vehicle side to the heat exchanger 203 on the apparatus side or in a direction from the heat exchanger 203 on the apparatus side to the heat exchanger 6 on the vehicle side.

A communication path 11 in which a command and the like can be transmitted and received passes between the vehicle-side coupling unit 5 and the BCU 4. A charging path 12 passes between the vehicle-side coupling unit 5 and the charger 3.

The communication path 11 and the charging path 12 may be physically separate lines or the charging path 12 may also serve as the communication path 11 by using power line communication (PLC).

The illustrated charging path 12 includes a positive electrode line and a negative electrode line.

A data line that enables transmission and reception of data is provided between the BCU 4 and the vehicle-side temperature sensor 9. The data line and the communication path 11 may be provided separately or the communication path 11 may also serve as the data line. That is, it is at least desired that data can be exchanged between the BCU 4 and the vehicle-side temperature sensor 9.

The coupling cable 201 extends from the outside-vehicle power feeding apparatus 200 and the apparatus-side coupling unit 202 having a shape that can be coupled to the vehicle-side coupling unit 5 is provided at the end of the coupling cable 201.

The apparatus-side coupling unit 202 includes the heat exchanger 203 and an apparatus-side temperature sensor 204.

The heat exchanger 203 is in contact with a circulation path 205 on the apparatus side, in which a coolant can circulate, so that heat generated in the heat exchanger 203 can propagate to the coolant.

The apparatus-side temperature sensor 204 can measure the temperature of the heat exchanger 203 of the apparatus-side coupling unit 202 for instance.

The outside-vehicle power feeding apparatus 200 includes a power feeder 206 for generating charging current, a controller 207, which performs control variously for charging the onboard battery 2, and a pump 208 for circulating the coolant in the circulation path 205.

The power feeder 206 may include a power supply inside the power feeder 206 or include an inverter or a converter that changes AC power supply voltage supplied from the outside of the outside-vehicle power feeding apparatus 200 for instance.

The controller 207 controls the power feeder 206 on a request from the BCU 4 of the vehicle 100.

For instance, the controller 207 may control the pump 208 on the basis of temperature information acquired from the apparatus-side temperature sensor 204.

A communication path 209 in which a command and the like can be transmitted and received passes between the controller 207 and the apparatus-side coupling unit 202.

A power feeding path 210 in which current can flow passes between the power feeder 206 and the apparatus-side coupling unit 202. The power feeding path 210 includes a positive electrode line and a negative electrode line.

Part of the communication path 209, part of the power feeding path 210, and part of the circulation path 205 constitute part of the coupling cable 201. A data line in which data as the temperature information can be transmitted and received passes between the controller 207 and the apparatus-side temperature sensor 204. The data line and the communication path 209 may be provided separately or the communication path 209 may also serve as the data line. When the data line is provided so as to be separate from the communication path 209, the data line is also included in the coupling cable 201.

When the vehicle-side coupling unit 5 and the apparatus-side coupling unit 202 are coupled together, coupling for communication and coupling for charging are established.

The BCU 4 and the controller 207 can perform information communication by being coupled together through the communication path 11, the vehicle-side coupling unit 5, the apparatus-side coupling unit 202, and the communication path 209.

Charging current from the power feeder 206 is supplied to the onboard battery 2 through the power feeding path 210, the apparatus-side coupling unit 202, the vehicle-side coupling unit 5, the charging path 12, and the charger 3. The onboard battery 2 can be charged accordingly.

<2. Operation of Onboard Charging System>

Figure 3A:
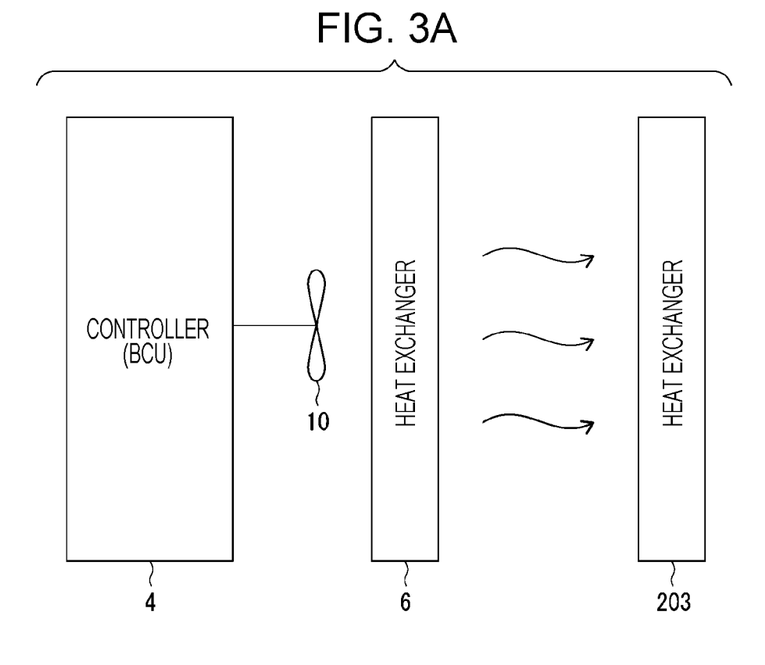
FIGS. 3A and 3B are each a schematic diagram illustrating how a fan causes heat exchange.
Figure 3B:
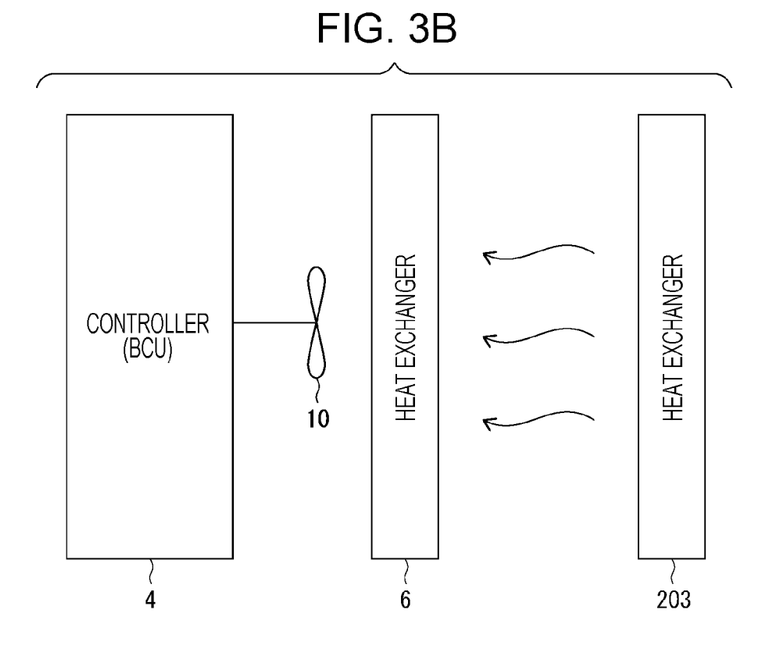

FIGS. 3A and 3B each illustrate a state where heat exchange is performed between the heat exchanger 6 of the vehicle-side coupling unit 5 and the heat exchanger 203 of the apparatus-side coupling unit 202.

As illustrated in FIG. 2, the heat exchanger 6 of the vehicle-side coupling unit 5 can dissipate heat generated in charging through the circulation path 7. Similarly, the heat exchanger 203 of the apparatus-side coupling unit 202 can dissipate heat generated in charging through the circulation path 205.

Depending on an ambient environment of the vehicle 100 or the outside-vehicle power feeding apparatus 200, however, such heat may fail to be dissipated only through the circulation path 7 or the circulation path 205.

In such a case, the BCU 4 promotes heat exchange between the heat exchanger 6 and the heat exchanger 203 by controlling the fan 10.

When for instance, the temperature of the heat exchanger 6 of the vehicle-side coupling unit 5 is higher than the temperature of the heat exchanger 203 of the apparatus-side coupling unit 202, as illustrated in FIG. 3A, air is moved from the heat exchanger 6 on the vehicle side toward the heat exchanger 203 on the apparatus side by the BCU 4 causing the fan 10 to rotate in a predetermined direction. As a result, heat is moved from the heat exchanger 6 to the heat exchanger 203 and the heat exchanger 6 of the vehicle-side coupling unit 5 is cooled.

When the temperature of the heat exchanger 203 of the apparatus-side coupling unit 202 is higher than the temperature of the heat exchanger 6 of the vehicle-side coupling unit 5, as illustrated in FIG. 3B, air is moved from the heat exchanger 203 on the apparatus side toward the heat exchanger 6 on the vehicle side by the BCU 4 causing the fan 10 to rotate in the opposite direction of the predetermined direction. As a result, heat is moved from the heat exchanger 203 to the heat exchanger 6 and the heat exchanger 203 of the apparatus-side coupling unit 202 is cooled.

Figure 4:
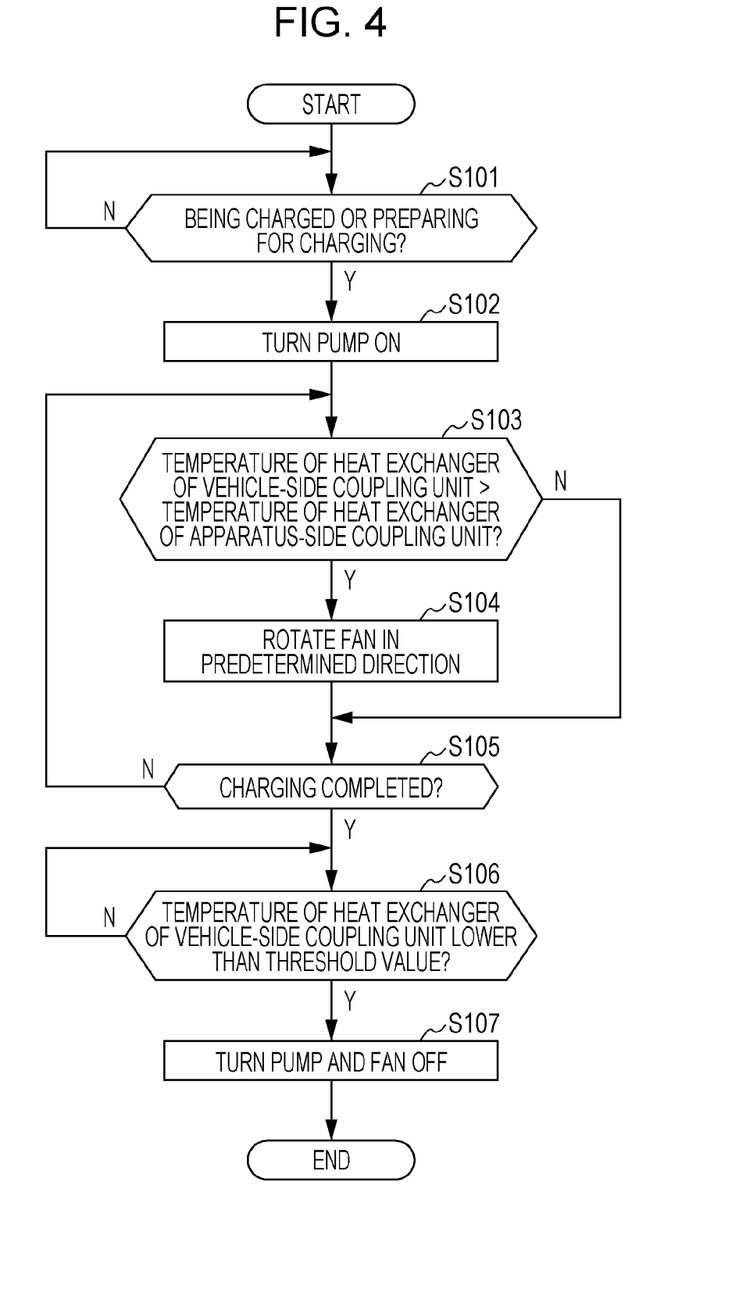
FIG. 4 is a flow chart illustrating a first instance of fan control by a battery control unit (BCU)

FIG. 4 is a flow chart illustrating a first instance of the control of the fan 10 performed by the BCU 4.

Firstly in step S101, the BCU 4 determines whether the onboard battery 2 of the vehicle 100 is being charged using the onboard charging system 1. That is, the BCU 4 determines whether charging that uses charging current supplied from the outside-vehicle power feeding apparatus 200 is being performed.

In step S101, the BCU 4 also determines whether the onboard battery 2 of the vehicle 100 is preparing for charging. Being preparing for charging indicates the state where the apparatus-side coupling unit 202 of the outside-vehicle power feeding apparatus 200 is coupled to the vehicle-side coupling unit 5 of the vehicle 100. Alternatively, being preparing for charging may indicate the state where the charging amount of the onboard battery 2 mounted on the vehicle 100 is smaller than or equal to a predetermined amount and the apparatus-side coupling unit 202 is coupled to the vehicle-side coupling unit 5.

If it is determined in step S101 that the onboard battery 2 is not being charged nor being preparing for charging, the BCU 4 performs step S101 again.

If it is determined in step S101 that the onboard battery 2 is being charged or being preparing for charging, the BCU 4 controls the pump 8 of the onboard charging system 1 so as to turn the pump 8 on in step S102. As a result, a coolant starts to circulate in the circulation path 7 and the heat exchanger 6 of the vehicle-side coupling unit 5 starts to be cooled.

Subsequently in step S103, the BCU 4 determines whether the temperature of the heat exchanger 6 of the vehicle-side coupling unit 5 is higher than the temperature of the heat exchanger 203 of the apparatus-side coupling unit 202.

The BCU 4 can directly acquire a measured value of the vehicle-side temperature sensor 9. A measured value of the apparatus-side temperature sensor 204 can be acquired through the controller 207 of the outside-vehicle power feeding apparatus 200.

If the temperature of the heat exchanger 6 of the vehicle-side coupling unit 5 is higher than the heat exchanger 203 of the apparatus-side coupling unit 202, the BCU 4 controls the fan 10 so as to rotate the fan 10 in a predetermined direction in step S104. As a result, as illustrated in FIG. 3A, air is moved from the heat exchanger 6 of the vehicle-side coupling unit 5 toward the heat exchanger 203 of the apparatus-side coupling unit 202 and heat is moved from the heat exchanger 6 to the heat exchanger 203. The heat moved to the heat exchanger 203 moves to, for instance, an outer sheath of the coupling cable 201 that covers the coolant in the circulation path 205 or the outer region of the circulation path 205, and is partially diffused into outside air.

After starting the control of the fan 10 in step S104 or after determining that the temperature of the heat exchanger 6 of the vehicle-side coupling unit 5 is not higher than the temperature of the heat exchanger 203 of the apparatus-side coupling unit 202 in step S103, the BCU 4 determines whether the charging is completed in step S105.

If the charging is not completed, the BCU 4 performs the processes of steps S103 to S105 again.

If the BCU 4 determines that the charging is completed, the BCU 4 performs subsequent step S106.

That the charging is completed indicates, for instance, the case where the coupling between the vehicle-side coupling unit 5 and the apparatus-side coupling unit 202 is canceled or the case where the charging amount of the onboard battery 2 is larger than or equal to the predetermined amount. Specifically, the completion of the charging can be achieved by using information on the state of charge (SOC) and the like.

In step S106, the BCU 4 determines whether the temperature of the heat exchanger 6 of the vehicle-side coupling unit 5 is lower than a threshold value. If the temperature of the heat exchanger 6 is higher than or equal to the threshold value, the BCU 4 performs the process of step S106 again.

If the temperature of the heat exchanger 6 is lower than the threshold value, the BCU 4 controls the pump 8 and the fan 10 so as to turn the pump 8 and the fan 10 off in step S107.

As a result, the circulation of the coolant in the circulation path 7 is stopped and the air blowing by the fan 10 is also stopped.

If the BCU 4 determines that the charging is completed in step S105, it is unlikely that the temperature of the heat exchanger 6 of the vehicle-side coupling unit 5 will further increase and thus, the fan 10 and the pump 8 may be stopped immediately by performing the process of step S107 without performing the process of step S106. As a result, power consumption of the onboard battery 2 or an unillustrated lead-acid storage battery can be reduced.

Alternatively, one of the fan 10 and the pump 8 may be stopped immediately and the other may be stopped according to the result of the determination process of step S106.

When the process of step S105 ends, the fan 10 may be rotating even in a state where the coupling between the vehicle-side coupling unit 5 and the apparatus-side coupling unit 202 is canceled, that is, in a state where it is determined that the charging is completed. In this case, the air blowing by the fan 10 causes warm air to flow out from the vicinity of the heat exchanger 6 of the vehicle-side coupling unit 5 into space outside the vehicle. Accordingly, heat is dispersed from the heat exchanger 6 outside the vehicle.

A second instance of the control of the fan 10 performed by the BCU 4 is described with reference to FIG. 5. The same numerals are given to processes similar to those illustrated in FIG. 4 and the descriptions thereof are omitted as appropriate.

The BCU 4 determines the charging state and controls the pump 8 so as to turn the pump 8 on by performing steps S101 and S102.

Subsequently in step S108, the BCU 4 determines whether the temperature of the heat exchanger 6 of the vehicle-side coupling unit 5 is higher than or equal to a threshold value. That is, processes are performed by checking only the temperature of the heat exchanger 6 of the vehicle-side coupling unit 5, irrespective of the temperature of the heat exchanger 203 of the apparatus-side coupling unit 202. Thus, it is unnecessary to acquire a measured value of the apparatus-side temperature sensor 204 through the controller 207 of the outside-vehicle power feeding apparatus 200 and the processes are simplified.

If the temperature of the heat exchanger 6 of the vehicle-side coupling unit 5 is higher than or equal to the threshold value, the BCU 4 causes the fan 10 to rotate in a predetermined direction in step S104 (see FIG. 3A). Since the processes of steps S105 to step S107 are similar to those in the first instance, the descriptions thereof are omitted.

A third instance of the control of the fan 10 performed by the BCU 4 is described with reference to FIG. 6. The same numerals are given to processes similar to those illustrated in FIG. 4 and the descriptions thereof are omitted as appropriate.

The BCU 4 compares the temperature of the heat exchanger 6 of the vehicle-side coupling unit 5 with the temperature of the heat exchanger 203 of the apparatus-side coupling unit 202 by performing the processes of steps S101 to S103.

If the temperature of the heat exchanger 6 of the vehicle-side coupling unit 5 is higher than the temperature of the heat exchanger 203 of the apparatus-side coupling unit 202, the BCU 4 performs processes similar to those in the above-described first instance and second instance.

If the temperature of the heat exchanger 203 of the apparatus-side coupling unit 202 is higher than or equal to the temperature of the heat exchanger 6 of the vehicle-side coupling unit 5, the BCU 4 controls the fan 10 so as to rotate the fan 10 in the opposite direction of the predetermined direction. As a result, as illustrated in FIG. 3B, air is blown from the heat exchanger 203 of the apparatus-side coupling unit 202 toward the heat exchanger 6 of the vehicle-side coupling unit 5 and heat is moved.

Such control may cause a malfunction of the battery, decrease in charging capacity, or the like if charging of the onboard battery 2 is attempted in a state where the vehicle 100 or the onboard charging system 1 is not warmed sufficiently, such as in cold climate areas. To prevent such a state, in starting charging, the onboard battery 2 and peripheral members thereof are warmed while performing the charging little by little by causing a small amount of current to flow, or the onboard battery 2 is heated with a heater before the charging for instance.

In the present example, in addition to or instead of such measures, the onboard battery 2 and the peripheral members thereof can be warmed by moving heat from from the heat exchanger 203 of the apparatus-side coupling unit 202 of the outside-vehicle power feeding apparatus 200 to the heat exchanger 6 of the vehicle-side coupling unit 5 through the charging path 12 and the charger 3. As a result, decrease in charging capacity, a malfunction of the onboard battery 2, etc. can be prevented.

Subsequently, the BCU 4 performs the processes of steps S105 to S107.

As a result, heat can be exchanged suitably between the heat exchanger 6 of the vehicle-side coupling unit 5 and the heat exchanger 203 of the apparatus-side coupling unit 202.

Figure 5:
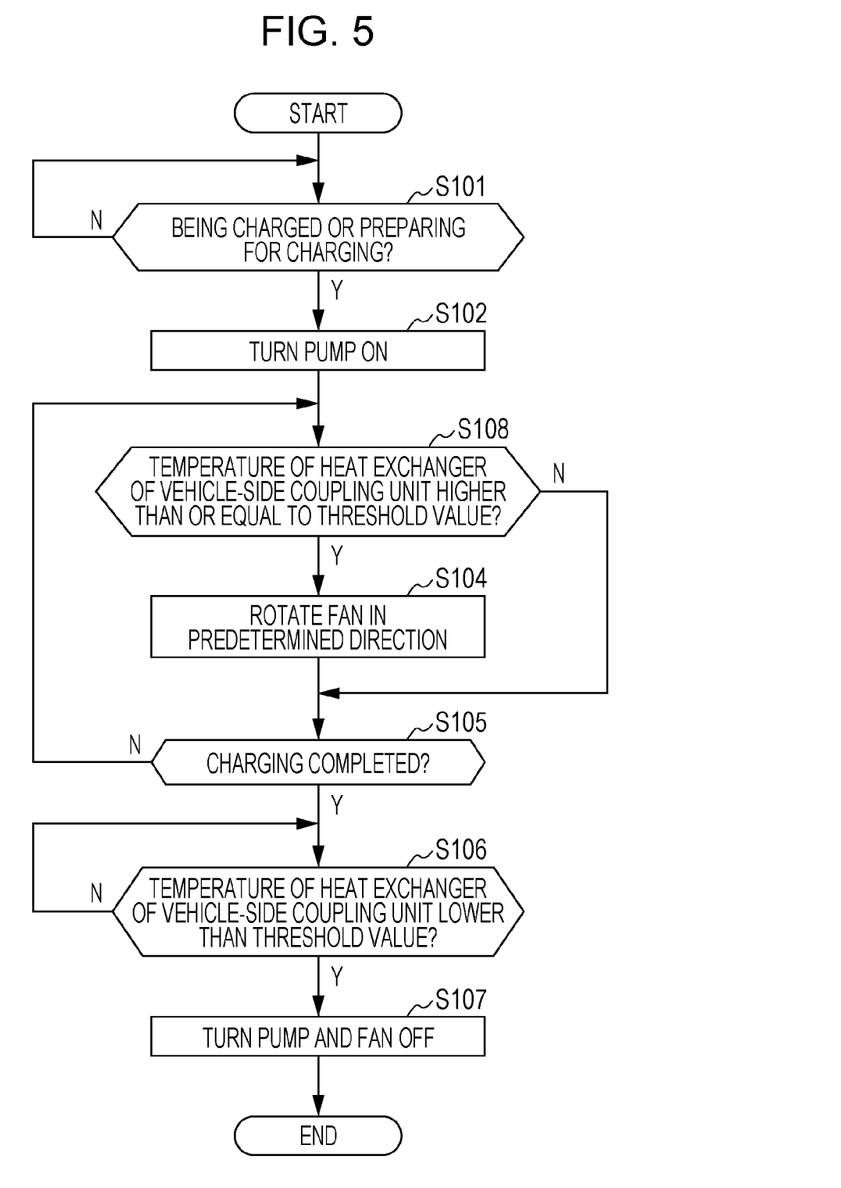
FIG. 5 is a flow chart illustrating a second instance of the fan control by the BCU.
Figure 6:
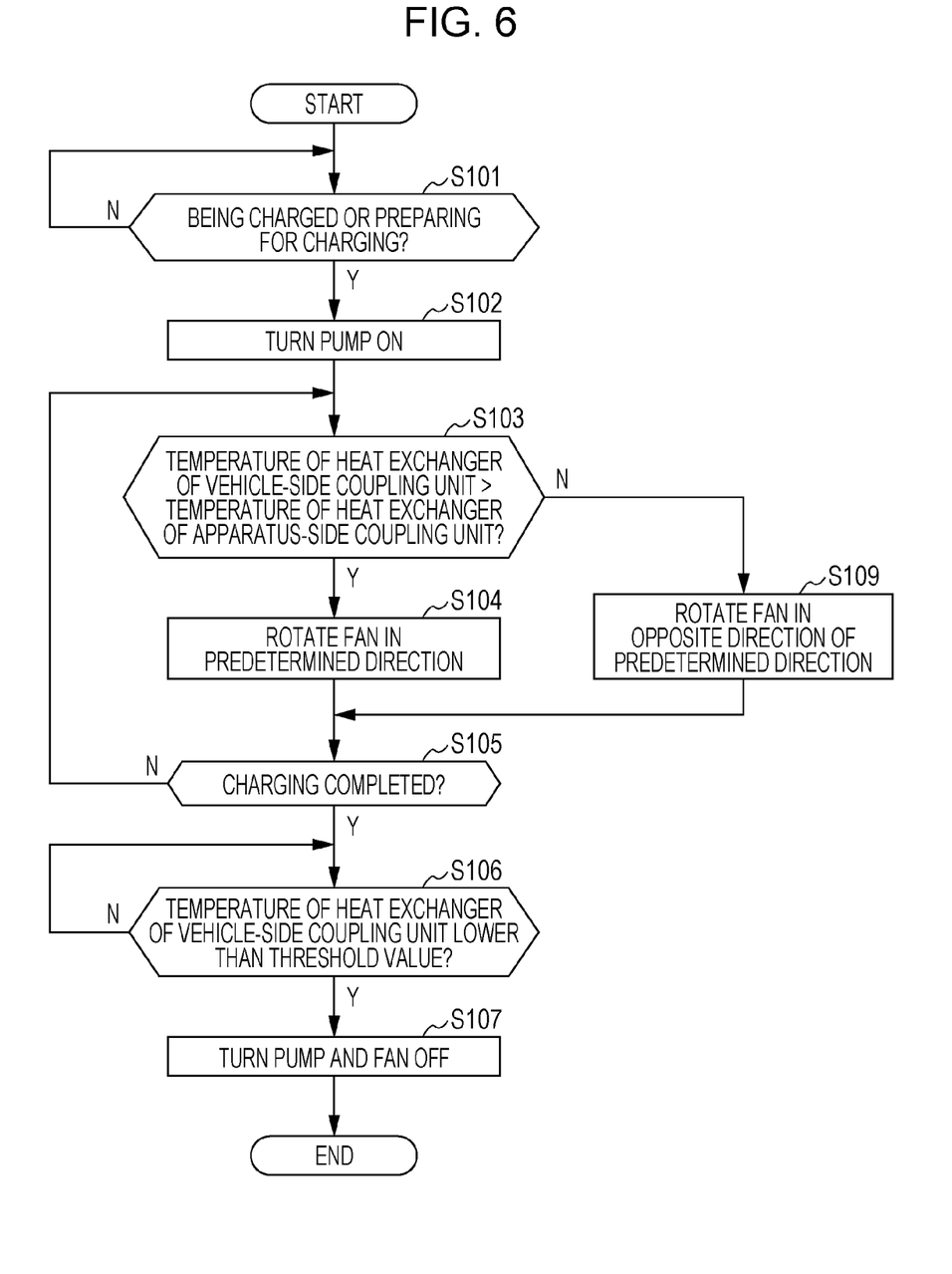
FIG. 6 is a flow chart illustrating a third instance of the fan control by the BCU.

In the procedure illustrated in FIG. 6, the process of step S108 illustrated in FIG. 5 may be performed instead of the process of step S103.

<3. Variation>

Figure 7:
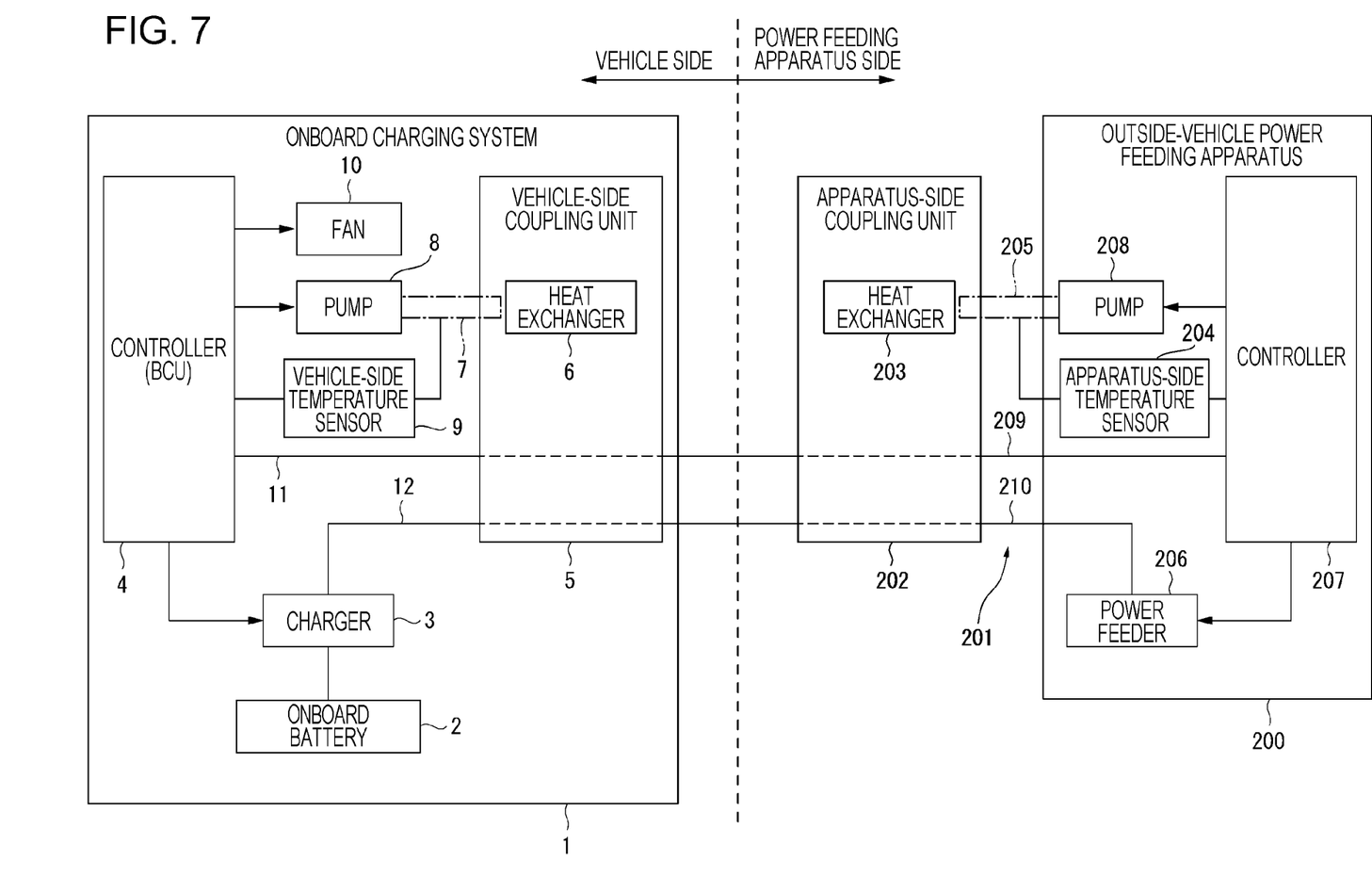
FIG. 7 is a block diagram illustrating a variation of the onboard charging system and the power feeding apparatus.

FIG. 7 is a block diagram illustrating a variation of the onboard charging system 1 and the outside-vehicle power feeding apparatus 200.

Differences between the block diagram in FIG. 7 and that in FIG. 2 are the measurement object of the vehicle-side temperature sensor 9 and the measurement object of the apparatus-side temperature sensor 204. That is, the vehicle-side temperature sensor 9 is configured to measure the temperature of the coolant that circulates in the circulation path 7, instead of measuring the temperature of the heat exchanger 6 of the vehicle-side coupling unit 5 or the temperature of another portion of the vehicle-side coupling unit 5.

The apparatus-side temperature sensor 204 is configured to measure the temperature of the coolant that circulates in the circulation path 205.

The BCU 4 estimates the temperature of the heat exchanger 6 from the temperature of the coolant that circulates in the circulation path 7. Similarly, the controller 207 of the outside-vehicle power feeding apparatus 200 estimates the temperature of the heat exchanger 203 from the temperature of the coolant that circulates in the circulation path 205. After that, the BCU 4 performs the processes in FIG. 4, 5, or 6 on the basis of information on the estimated temperature. Specifically, in step S103 in FIG. 4, information on the temperature of the coolant that circulates in the circulation path 7 of the onboard charging system 1 is used instead of using the information on the temperature of the heat exchanger 6 of the vehicle-side coupling unit 5. Further, information on the temperature of the coolant that circulates in the circulation path 205 of the outside-vehicle power feeding apparatus 200 is used instead of using the information on the temperature of the heat exchanger 203 of the apparatus-side coupling unit 202. The similar applies to step S106 in FIG. 4, step S108 in FIG. 5, and so forth.

While the vehicle-side temperature sensor 9 may be configured to directly measure the temperature of the heat exchanger 6, the apparatus-side temperature sensor 204 may be configured to measure the temperature of the coolant in the circulation path 205. On the contrary, while the vehicle-side temperature sensor 9 may be configured to measure the temperature of the coolant in the circulation path 7, the apparatus-side temperature sensor 204 may be configured to directly measure the temperature of the heat exchanger 203.

For another instance, the vehicle-side temperature sensor 9 may be configured to measure an atmospheric temperature in the vehicle 100, such as an atmospheric temperature around the onboard battery 2, or may be configured to measure an atmospheric temperature outside the vehicle. The BCU 4 is desired to use a measured value of the vehicle-side temperature sensor 9 by taking a difference in temperature from that of the heat exchanger 6, which depends on a position, into account. The similar applies to the apparatus-side temperature sensor 204.

Further, the vehicle-side temperature sensor 9 may be configured to measure the temperature of a portion that has the highest temperature in the onboard charging system 1. Enabling direct measurement of a portion where temperature conditions are most difficult in the onboard charging system 1 makes it possible to exert a heat exchange function suitably.

Figure 8:
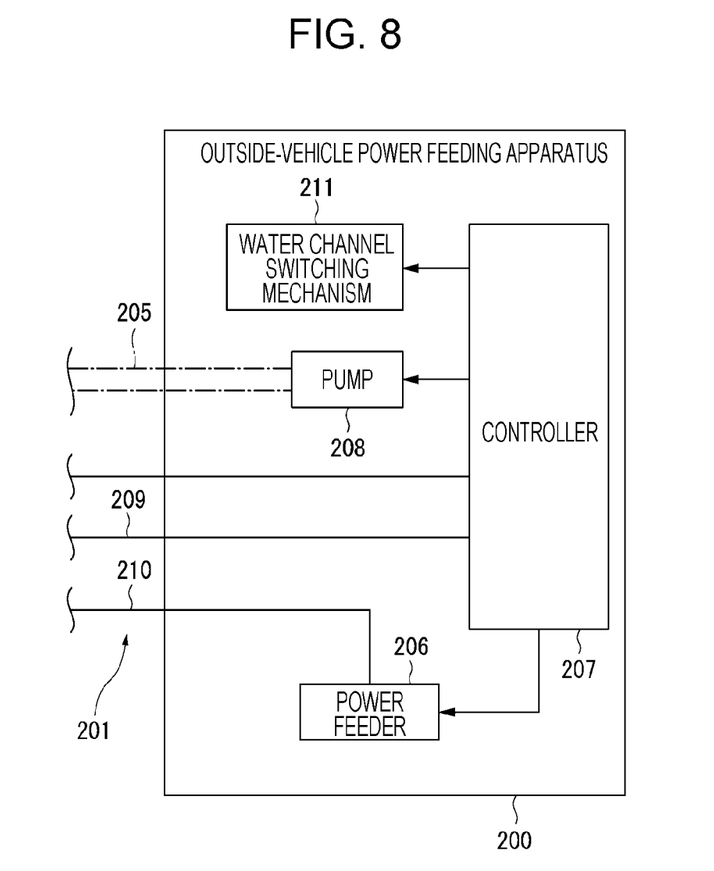
FIG. 8 is a block diagram illustrating another instance of the outside-vehicle power feeding apparatus.

FIG. 8 is a block diagram illustrating another instance of the outside-vehicle power feeding apparatus 200.

In the outside-vehicle power feeding apparatus 200 in FIG. 8, a water channel switching mechanism 211 is added as a control object of the controller 207. When the temperature of the coolant circulated in the circulation path 205 by the pump 208 is higher than or equal to a predetermined value, the water channel switching mechanism 211 switches a water channel so as to shunt the warmed coolant into space for interim storage in accordance with an instruction of the controller 207.

As a result, the warmed coolant is stored in the space for interim storage and can be used for various application purposes. Instances of various application purposes include to melt an accumulation of snow around the outside-vehicle power feeding apparatus 200, to warm the vehicle-side coupling unit 5 or the onboard battery 2 of another vehicle 100 that receives power feeding from the outside-vehicle power feeding apparatus 200, and to supply heating to a roofed space with walls that is positioned near the outside-vehicle power feeding apparatus 200, such as a waiting room. Thus, the heat generated in the vehicle-side coupling unit 5 can be utilized efficiently without causing waste.

Although a liquid such as a coolant or water circulates in the circulation path 7 in the above-described instances, gas like air may circulate in the circulation path 7.

Further, although the circulation path 7 comes into contact with the heat exchanger 6 of the vehicle-side coupling unit 5 or the circulation path 7 in the above-described instances, the circulation path 7 may come into the onboard battery 2 to enable the onboard battery 2 to be cooled.

In addition, although the ON/OFF control of the heat exchange function is achieved by turning the fan 10 on or off in the above-described instances, other instances are conceivable. As such a instance, the heat exchanger 6 of the vehicle-side coupling unit 5 may be configured to be movable according to the control of the BCU 4, and the control may be performed so that in turning the heat exchange function on, the heat exchanger 6 can come into contact with the heat exchanger 203 of the apparatus-side coupling unit 202 of the outside-vehicle power feeding apparatus 200. In turning the heat exchange function off, the contact state may be canceled by the BCU 4 causing the heat exchanger 6 to move in a direction that separates the heat exchanger 6 from the heat exchanger 203. That is, a heat radiation plate may be caused to come into and out of contact to yield the heat exchanger.

Moreover, the heat exchange may be performed using the coolant that circulates between the heat exchanger 6 of the vehicle-side coupling unit 5 and the heat exchanger 203 of the apparatus-side coupling unit 202.

<4. Outline>

As described above in the instances, the onboard charging system 1 according to the present example includes the onboard battery 2 that is mounted on the vehicle 100 and used to drive the vehicle 100, the vehicle-side coupling unit 5 that is configured to make the charging current path to the outside-vehicle power feeding apparatus 200 by being coupled to the apparatus-side coupling unit 202 of the outside-vehicle power feeding apparatus 200, the heat exchanger 6 that is provided in the vehicle-side coupling unit 5 and configured to perform heat exchange between the vehicle-side coupling unit 5 and the apparatus-side coupling unit 202, the controller (the BCU 4) that is configured to perform ON/OFF control of a function of the heat exchange performed by the heat exchanger 6, and the charger 3 that is configured to charge the onboard battery 2 by using the charging current path.

Thus, heat can be exchanged between the vehicle-side coupling unit 5 and the apparatus-side coupling unit 202 as needed.

Accordingly, the vehicle-side coupling unit 5 can be prevented from being heated excessively to a high temperature. That is, for instance, possibilities can be reduced that heat will deteriorate the vehicle-side coupling unit 5 or the periphery thereof and that a user of the vehicle 100 or an operator who performs charging will get scalded.

When the temperature of the vehicle-side coupling unit 5 becomes excessively low and falls below the temperature of the apparatus-side coupling unit 202, the temperature of the vehicle-side coupling unit 5 can be raised suitably by turning the heat exchange function on.

Further, the vehicle-side coupling unit 5 can be prevented more desirably from being warmed unnecessarily by enabling the ON/OFF control of the heat exchange function than a state where heat is constantly exchanged while the heat exchanger 6 of the vehicle-side coupling unit 5 and the heat exchanger 203 of the apparatus-side coupling unit 202 are provided so as to be in contact with each other.

This configuration enables not only the vehicle-side coupling unit 5 and a cable in the vehicle 100 but also the apparatus-side coupling unit 202 and the coupling cable 201 on the side of the outside-vehicle power feeding apparatus 200 to be cooled.

In addition, the onboard battery 2 in the vehicle 100 can also be cooled.

As described in each instance, the onboard charging system 1 may have a circulation path (the circulation path 7) that allows a coolant to circulate therein and the heat exchanger 6 may be configured to perform exchange heat with the coolant by coming into contact with part of the circulation path.

Thus, heat of the vehicle-side coupling unit 5 can be caused to escape to the coolant.

Accordingly, when the temperature of the vehicle-side coupling unit 5 becomes high, efficient cooling is enabled by causing the heat to escape to the apparatus-side coupling unit 202 and causing the heat to escape to the coolant that circulates on the vehicle side.

Further, as described in each instance, the onboard charging system 1 may include the fan 10 that is configured to blow air from one of the vehicle-side coupling unit 5 and the apparatus-side coupling unit 202 to the other of the vehicle-side coupling unit 5 and the apparatus-side coupling unit 202.

Thus, air can move easily between the vehicle-side coupling unit 5 and the apparatus-side coupling unit 202.

Accordingly, heat can be exchanged efficiently between the vehicle-side coupling unit 5 and the apparatus-side coupling unit 202.

Moreover, as described with reference to FIG. 2 and so forth, the vehicle-side temperature sensor 9 that is configured to measure the temperature of the heat exchanger 6 may be provided.

The ON/OFF control of the heat exchange function is performed according to the temperature of the heat exchanger 6 measured by the vehicle-side temperature sensor 9.

As a result, the heat exchanged function can be controlled suitably while taking the temperature of the heat exchanger 6 into account.

In addition, as described with reference to FIG. 2 and so forth, the vehicle-side temperature sensor 9 may be provided in the heat exchanger 6.

Thus, the temperature of the heat exchanger 6 itself can be measured.

That is, the temperature of the heat exchanger 6 can be measured correctly.

In addition, as described with reference to each figure, in a state where the vehicle-side coupling unit 5 and the apparatus-side coupling unit 202 are coupled to each other, the controller (the BCU 4) may be capable of acquiring information on the apparatus-side temperature sensor 204 configured to measure the temperature of the apparatus-side coupling unit 202.

Thus, the ON/OFF control of the heat exchange function can be performed, which is appropriate to the temperature of the apparatus-side coupling unit 202.

In particular, when the vehicle-side temperature sensor 9 is provided, the ON/OFF control of the heat exchange function can be performed suitably according to a difference in temperature between the vehicle-side coupling unit 5 and the apparatus-side coupling unit 202 because the temperatures of both the vehicle-side coupling unit 5 and the apparatus-side coupling unit 202 can be acquired.

As described above, each unit on the vehicle side and each unit on the power feeding apparatus side can be cooled.

The above-described configuration instances and variation may be combined in any way only if the combination is possible. In such a case, various advantages can be obtained in a mixed manner.

The invention claimed is:

1. An onboard charging system comprising:
   an onboard battery that is configured to be mounted on a vehicle and used to drive the vehicle;
   a vehicle-side coupling unit that is configured to make a charging current path to an outside-vehicle power feeding apparatus by being coupled to an apparatus-side coupling unit of the outside-vehicle power feeding apparatus;
   a heat exchanger that is provided in the vehicle-side coupling unit and configured to perform heat exchange between the vehicle-side coupling unit and the apparatus-side coupling unit;
   a second heat exchanger that is provided in the apparatus-side cooling unit and configured to perform heat exchange between the vehicle-side coupling unit and the apparatus-side coupling unit;
   a controller that is configured to perform ON/OFF control of a function of the heat exchange performed by the heat exchanger; and
   a charger that is configured to charge the onboard battery by using the charging current path,
   wherein a function of the heat exchange performed by the controller includes reversing a flow of the heat exchange between the heat exchanger and the second heat exchanger,
   wherein a vehicle-side temperature sensor that is configured to measure a temperature of the heat exchanger is provided,
   wherein an apparatus-side temperature sensor that is configured to measure a temperature of the second heat exchanger is provided, and
   wherein the controller chances the flow between the heat exchanger and the second heat exchanger such that the flow is in a direction from the one of the heat exchanger and the second heat exchanger having a higher temperature.

2. The onboard charging system according to claim 1, having
   a circulation path that allows a coolant to circulate therein, the heat exchanger being configured to exchange heat with the coolant by coming into contact with part of the circulation path.

3. The onboard charging system according to claim 2, wherein
   in a state where the vehicle-side coupling unit and the apparatus-side coupling unit are coupled to each other, the controller is capable of acquiring information on an apparatus-side temperature sensor that is configured to measure a temperature of the apparatus-side coupling unit.

4. The onboard charging system according to claim 1, further comprising
   a fan that is configured to blow air from either the vehicle-side coupling unit to the apparatus-side coupling unit or from the apparatus-side coupling unit to the vehicle-side coupling unit.

5. The onboard charging system according claim 2, further, comprising a fan that is configured to blow air from either the vehicle-side coupling unit to the apparatus-side coupling unit or from the apparatus-side coupling unit to the vehicle-side coupling unit.

6. The onboard charging system according to claim 4, wherein
in a state where the vehicle-side coupling unit and the apparatus-side coupling unit are coupled to each other, the controller is capable of acquiring information on an apparatus-side temperature sensor that is configured to measure a temperature of the apparatus-side coupling unit.

7. The onboard charging system according to claim 5, wherein
in a state where the vehicle-side coupling unit and the apparatus-side coupling unit are coupled to each other, the controller is capable of acquiring information on an apparatus-side temperature sensor that is configured to measure a temperature of the apparatus-side coupling unit.

8. The onboard charging system according to claim 1, wherein
the vehicle-side temperature sensor is provided in the heat exchanger.

9. The onboard charging system according to claim 1, wherein
in a state where the vehicle-side coupling unit and the apparatus-side coupling unit are coupled to each other, the controller is capable of acquiring information on an apparatus-side temperature sensor that is configured to measure a temperature of the apparatus-side coupling unit.

10. The onboard charging system according to claim 1, further comprising a fan installed in the vehicle-side coupling unit and is configured to facilitate the flow of the heat exchange between the heat exchanger and the second heat exchanger.

11. The onboard charging system according to claim 1, wherein the controller controls a rotation of the fan such that the flow of the heat exchange flows from the heat exchanger to the second heat exchanger or flow from the second heat exchanger to the first heat exchanger.

12. An onboard charging system comprising:
an onboard battery that is mounted on a vehicle and used to drive the vehicle;
a vehicle-side coupling unit that is configured to make a charging current path to an outside-vehicle power feeding apparatus by being coupled to an apparatus-side coupling unit of the outside-vehicle power feeding apparatus;
a heat exchanger that is provided in the vehicle-side coupling unit and configured to perform heat exchange between the vehicle-side coupling unit and the apparatus-side coupling unit;
a second heat exchanger that is provided in the apparatus-side cooling unit and configured to perform heat exchange between the vehicle-side coupling unit and the apparatus-side coupling unit;
circuitry that is configured to perform ON/OFF control of a function of the heat exchange performed by the heat exchanger; and
a charger that is configured to charge the onboard battery by using the charging current path,
wherein a function of the heat exchange performed by the controller includes reversing a flow of the heat exchange between the heat exchanger and the second heat exchange,
wherein a vehicle-side temperature sensor that is configured to measure a temperature of the heat exchanger is provided,
wherein an apparatus-side temperature sensor that is configured to measure a temperature of the second heat exchanger is provided, and
wherein the circuitry changes the flow between the heat exchanger and the second heat such that the flow is in a direction from the one of the heat exchanger and the second heat exchanger having a higher temperature.

* * * * *